Feb. 14, 1928.

B. MIERS 1,659,117

DUMMY COURSING RABBIT

Filed Oct. 18, 1926

Bert Miers Inventor

By Emil F. Lange

Attorney

Patented Feb. 14, 1928.

1,659,117

UNITED STATES PATENT OFFICE.

BERT MIERS, OF SEWARD, NEBRASKA.

DUMMY COURSING RABBIT.

Application filed October 18, 1926. Serial No. 142,433.

My invention relates to dummy game, and more particularly to dummy rabbits for use in coursing meets, and its object is the provision of a dummy animal and a carriage which will simulate a live animal in both its appearance and movements, thus doing away with the necessity of employing live animals for the purpose.

Having in view these objects and others which will be pointed out in the following description, I will now refer to the drawings, in which Figure 1 is a view in perspective of the dummy animal and carriage and showing also one of the optional forms of actuating devices.

Figure 1:
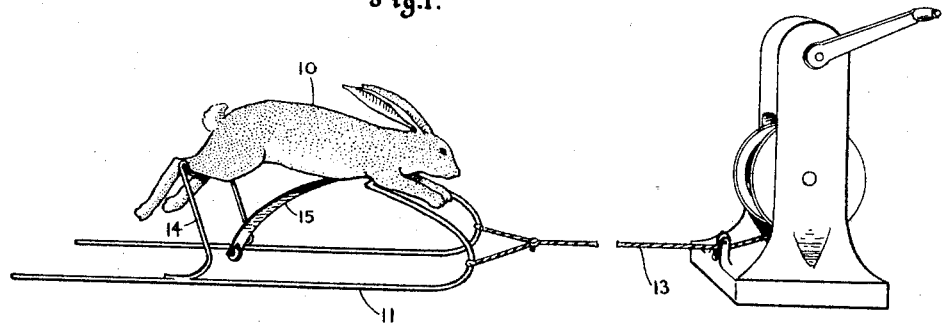
Figures 2, 3:
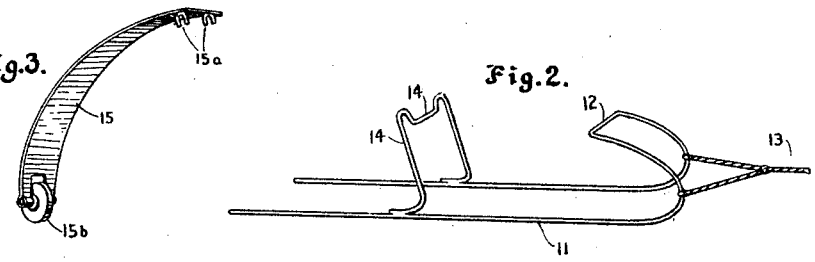
Figure 2 is a view in perspective of the carriage alone.
Figure 3 is a view in perspective of the attachment for the carriage, the purpose of which is to cause the dummy animal to leap during its forward movement.
Figure 4:
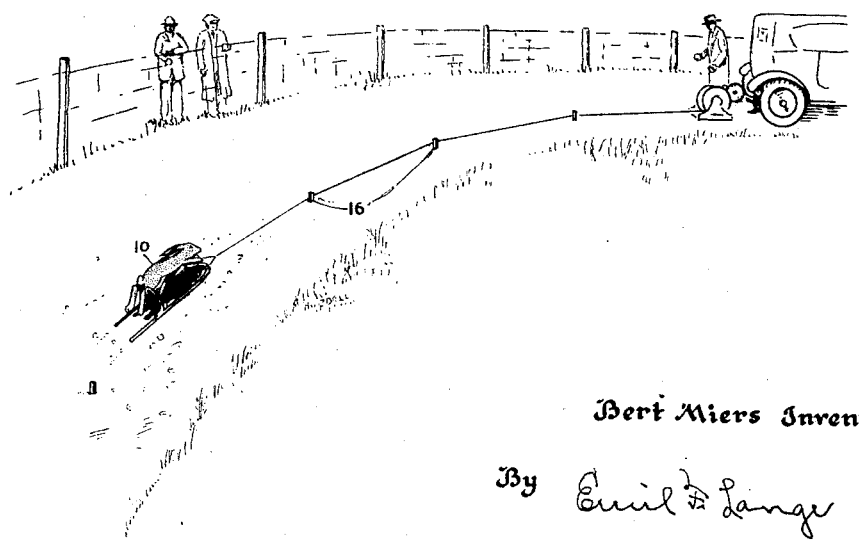
Figure 4 is an illustration of a portion of a course and showing particularly the devices whereby the dummy animal is caused to travel in a path other than a straight line and showing also connections whereby it is propelled by means of a drum which is driven by one of the rear wheels of an automobile.

The animal in the present instance is a rabbit and preferably a jack rabbit. It is made by stuffing the skin of a rabbit with some very light-weight material such as feathers. The use of feathers is advantageous because the forward and leaping movements of the rabbit will appear more natural than if heavier material were used and also because the center of gravity of the entire structure will be much lower to thus avoid the possibility of overturning. The carriage, as shown in Figure 2, is in the form of a sled or toboggan. The main portion comprises a structure made of wire which is bent into U-form and having its closed end curved upwardly. The sled thus comprises two runners 11 and a forward curved portion which is closed at 12 somewhat in the rear of the forward extremity of the sled. The cord 13 is secured to both runners at the extreme forward end of the sled as shown in Figures 1 and 2. In addition there is an inverted U-shaped wire construction 14 which is preferably welded at its ends to the runners 11, the part 14 serving both as a brace and as a rear support for the rabbit. The brace 14 has a central depressed portion 14ª.

The rabbit 10 is secured at its shoulders to the portion 12 of the sled and is allowed to rest on the portion 14′ of the brace 14. It thus has slight pivotal movements about the portion 12 as a pivot, and the rear portion of the rabbit is thus permitted to move slightly up and down so as to give it the appearance of leaping. In order to positively produce this result I provide an attachment 15 as shown in Figure 3. This attachment has secured thereto at its forward end by means of a pair of clips 15ª which are adapted to straddle the portion 12 of the sled. The clips 15ª are open at their lower extremities but the attachment 15 is prevented from being jarred off the sled by the fact that the dummy rabbit is secured to the sled at points immediately above the clips 15ª. The attachment 15 is curved rearwardly and downwardly so that it comes in contact with the surface of the ground. It will be obvious that during the forward movement of the sled, any irregularities in the surface of the ground will cause slight but sudden upward movements of the attachment 15. Such movements will be communicated to the rabbit 10. While the attachment 15 usually functions perfectly even when the lower rear end is plain, I find it desirable in certain cases to secure a small wheel 15ᵇ to facilitate both the forward travel and the jumping movements of the attachment.

The device is used in coursing meets which usually are provided with straight tracks. Occasionally it is desired to cause the animal to travel on a curved track and when this is done it is only necessary to provide a plurality of pegs 16 which are driven into the ground along the path which it is desired that the animal take. These pegs project only slightly above the surface of the ground as the main body of the cord 13 is almost in immediate contact with the ground. When during the travel of the carriage a peg comes in contact with the cord 13 at its junction, the cord will jump off the peg and the sled will straddle the peg and will move in a straight line toward the next succeeding peg where the same action is repeated, the succession of straight line movements having the appearance of movement along a curved path.

Coursing meets were formerly carried on with live rabbits which were released on the track to be chased by the hounds. This practice has been open to a number of objections but it has not been changed because of the difficulty of finding a suitable substitute for the live rabbit. The carriage and dummy rabbit which I have described is a perfect substitute for the live rabbit. It can be made to move at any desired rate of speed and in its movements it resembles the live rabbit to such an extent as to deceive both the spectators and the hounds. The sled and the cord for drawing the sled are naturally inconspicuous and they can be made more so by giving them a gray tint or other similar tint which blends with the soil over which they travel. The cord with the sled may be drawn by means of any desired mechanism. Merely for purposes of illustration I have shown two devices, both of which work satisfactorily for moving the dummy rabbit. In the one case the winding drum is propelled by hand operated gearing which is so geared as to give the winding drum the requisite speed. The automobile also furnishes an excellent source of power for turning the winding drum. If the rear portion of the automobile is jacked up and one of the rear tires is removed the rim itself will make an excellent winding drum which can be actuated at any desired speed by speeding up or slowing down the engine of the automobile.

Having thus described my invention in such full, clear, and exact terms that its construction and operation will be readily understood by others skilled in the art to which it pertains, what I claim as new and desire to secure by Letters Patent of the United States is:

1. A dummy quadruped and a carriage therefor, said carriage including a pair of sled runners and a cross bar of integral construction, said cross bar being positioned above and rearwardly of the forward extremities of said runners and being loosely secured to said dummy quadruped below the shoulder joints thereof, and a rear cross bar secured to said runners at points forwardly of the rear extremities thereof, said rear cross bar being elevated and being adapted to loosely support said dummy quadruped at the knee joints thereof.

2. A sled and a dummy coursing quadruped supported thereby, said sled including a forward cross bar merging into forward end members which are curved first forwardly and downwardly and then rearwardly and downwardly, said forward end members terminating in parallel and rearwardly projecting runners, a rearwardly and downwardly curved lever loosely secured to said forward cross bar, an inverted U-shaped cross bar rigidly secured to both of said runners at intermediate points thereof, said dummy quadruped being loosely secured at its shoulder joints to said forward cross bar with its breast resting on said rearwardly and downwardly inclined lever, said dummy quadruped also resting at its knee joints on said inverted U-shaped cross bar.

In testimony whereof I affix my signature.

BERT MIERS.